United States Patent Office 3,061,625
Patented Oct. 30, 1962

3,061,625
PHOSPHATES AND THIOPHOSPHATES
Lester Friedman, Whitestone, N.Y., assignor to Weston Chemical Corporation, Newark, N.J., a corporation of New Jersey
No Drawing. Filed June 15, 1961, Ser. No. 117,268
11 Claims. (Cl. 260—461)

This application is a continuation-in-part of application Serial No. 109,842, filed May 15, 1961, now Patent No. 3,009,939. The entire disclosure of the parent application is hereby incorporated by reference.

The present invention relates to tertiary phosphate and tertiary thiophosphate esters.

It is an object of the present invention to prepare novel phosphates and thiophosphates.

Another object is to prepare linear monomeric tertiary phosphates and thiophosphates having a majority of secondary hydroxyl groups from the corresponding tertiary phosphites.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing tertiary phosphates and thiophosphates having the formula

where $R_1$ is

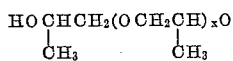

$R_2$ and $R_3$ are selected from the group consisting of $R_1$, alkoxy and aryloxy, Q is a chalcogen having an atomic weight not over 32, i.e. oxygen or sulfur and $x$ is an integer of at least one.

Preferably $R_2$ and $R_3$ are the same as $R_1$, i.e. all of them are polypropylene glycol residues. The $R_1$ grouping is written as

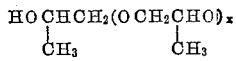

since generally over 50% and usually the vast majority of the groupings present (e.g. about 90%) will have this secondary alcohol relationship.

Examples of polypropylene glycol phosphates and thiophosphates of the above formula in which the free hydroxyl groups are primarily secondary hydroxyl groups and included within the present invention are tris-dipropylene glycol phosphate, tris-polypropylene glycol 425 phosphate, tris-dipropylene glycol thiophosphate, tris-polypropylene glycol 425 thiophosphate, tris-polypropylene glycol 1025 phosphate, tris-polypropylene glycol 2025 phosphate, tris-polypropylene glycol 2025 thiophosphate, tris-polypropylene glycol 1025 thiophosphate, tris-polypropylene glycol 3000 phosphate, tris-polypropylene glycol 3000 thiophosphate, bis-dipropylene glycol phenyl phosphate, bis-dispropylene glycol phenyl thiophosphate, bis-dipropylene glycol decyl phosphate, bis-dipropylene glycol decyl thiophosphate, bis-dipropylene glycol p-cresyl phosphate, bis-dipropylene glycol p-cresyl thiophosphate, bis-dipropylene glycol octadecyl phosphate, bis-dipropylene glycol octadecyl thiophosphate, bis-polypropylene glycol 425 phenyl phosphate, bis-polypropylene glycol 425 phenyl thiophosphate bis-polypropylene glycol 425 decyl phosphate, bis-polypropylene glycol 425 decyl thiophosphate, bis-polypropylene glycol 1025 octadecyl phosphate, bis-polypropylene glycol 1025 octadecyl thiophosphate, dipropylene glycol bis-phenyl phosphate, dipropylene glycol bis-phenyl thiophosphate, dipropylene glycol bis-decyl phosphate, dipropylene glycol bis-decyl thiophosphate, dipropylene glycol bis-octadecyl phosphate, dipropylene glycol bis-octadecyl thiophosphate, dipropylene glycol bis-o-cresyl phosphate, dipropylene glycol bis-o-cresyl thiophosphate, polypropylene glycol 425 bis-phenyl phosphate, polypropylene glycol 425 bis-phenyl thiophosphate, polypropylene glycol 1025 bis-decyl phosphate, polypropylene glycol 1025 bis-decyl thiophosphate, dipropylene glycol phenyl decyl phosphate and dipropylene glycol phenyl decyl thiophosphate.

The new phosphates and thiophosphates have many uses. They serve as plasticizers for polyurethanes, for example.

It is important that the phosphates be prepared in the manner indicated. According to Adams Patent 2,372,244 if phosphoric acid is reacted with excess propylene oxide to produce tris dipropylene glycol phosphate the free hydroxyl groups are primary hydroxyl groups rather than secondary hydroxyl groups. The procedure of Adams, moreover, will only form tris dipropylene glycol phosphate regardless of how many mols excess propylene oxide are employed. By the present invention it is possible to prepare tris polypropylene glycol phosphates having 3 or more propylene oxide units.

The tris-polypropylene glycol phosphates and thiophosphates are particularly useful. Because of their hydroxyl groups they are excellent for incorporation into urethane systems where they react with the isocyanate groups in the growing polymer chain and thus become fixed. They can be the sole hydroxyl reactant present or they can be used in admixture with other polyhydroxy compounds in forming the polyurethanes. Thus they can be used in a manner analogous to the corresponding phosphites. Due to their functionability they serve to also crosslink and strengthen the polymer chain.

The tris-polypropylene glycol phosphates and thiophosphates like the corresponding phosphites can be incorporated into epoxy resin systems. Thus tris-dipropylene glycol phosphate and tris-dipropylene glycol thiophosphate can react directly in an epoxy system catalyzed preferably by an alkyl aminate. The tris-polypropylene glycol phosphates and thiophosphates can be prereacted with maleic anhydride or other polybasic acid or anhydride to give the corresponding acid ester phosphite ester which can react in many epoxy systems without additional catalyst.

Like the corresponding tris-polypropylene glycol phosphites the tris-polypropylene glycol phosphates and thiophosphates can be employed to form polyesters, e.g., by reaction, e.g. mole for mole with maleic anhydride, phthalic anhydride, dimethyl terephthalate, fumaric acid, succinic acid, oxalic acid, itaconic acid, etc.

Like the corresponding phosphites the phosphates and thiophosphates are also useful as lubricants, heat transfer fluids, hydraulic fluids and pump fluids. They can be used in place of tricresyl phosphate as gasoline additives, e.g. in an amount of 0.1%. They are also suitable as plasticizers in polyester systems and free radical formed systems, e.g. polymerized methyl methacrylate. The thiophosphates are suitable as stabilizers for polyethylene, e.g. when used in an amount 0.25–10% by weight of the polyethylene. They can be used in existing glycol type lubricants and fluids.

The polypropylene glycol phosphates are prepared by oxidizing the corresponding phosphites, e.g. with hydrogen peroxide (either 30% or 50% concentration) or other peroxy compounds, e.g. peracetic acid. The peroxy compound is used in an equimolar (stoichiometric) amount.

The polypropylene glycol phosphates and thiophosphates of the present invention are viscous liquids.

The polypropylene glycol thiophosphates are prepared by adding the stoichiometric quantity of sulfur (i.e., one atomic weight) to the corresponding phosphate and heating to 110–130° C.

Preferably a small amount of a base, e.g., sodium or potassium hydroxide or carbonate, is added in the peroxide oxidation of the phosphite. The base is used in an amount just sufficient to render the mixture alkaline. In Examples 1–4 there was added just enough potassium carbonate to render the mixture basic.

Unless otherwise indicated, all parts and percentages are by weight.

EXAMPLE 1

68 parts of 50% aqueous hydrogen peroxide (1 mole of hydrogen peroxide) were stirred into 430 parts of tris-dipropylene glycol phosphite (1 mole). After reaction was complete, the water was distilled off leaving a residue of tris-dipropylene glycol phosphate in which the free hydroxyl groups were primarily (about 90%) secondary hydroxyl groups.

EXAMPLE 2

One mole of hydrogen peroxide (as a 50% aqueous solution) was stirred into 1 mole of tris-polypropylene glycol 425 phosphite. After reaction was complete the water present was distilled off leaving a residue of tris-polypropylene glycol 425 phosphate in which the free hydroxyl groups were primarily (about 90%) secondary hydroxyl groups.

EXAMPLE 3

One mole of hydrogen peroxide (as a 50% aqueous solution) was stirred into 1 mole of tris-polypropylene glycol 1025 phosphite. After reaction was complete the water present was distilled off leaving a residue of tris-polypropylene glycol 1025 phosphate in which the free hydroxyl groups were primarily secondary hydroxyl groups.

EXAMPLE 4

One mole of hydrogen peroxide (as a 50% aqueous solution) was stirred into 1 mole of tris-polypropylene glycol 2025 phosphite. After reaction was complete the water present was distilled off leaving a residue of tris-polypropylene glycol 2025 phosphate in which the free hydroxyl groups were primarily secondary hydroxyl groups.

EXAMPLE 5

To 1 mole of tris-polypropylene glycol phosphite there was added the stoichiometric amount of sulfur (32 parts). The mixture was heated to 110–130° C. until reaction was complete. The product was tris-dipropylene glycol thiophosphate in which the hydroxyl groups were primarily (about 90%) secondary hydroxyl groups.

EXAMPLE 6

To 1 mole of tris-polypropylene glycol phosphite 425 there was added the stoichiometric amount of sulfur. The mixture was heated to 120° C. until reaction was complete. The product was tris-polypropylene glycol 425 thiophosphate in which the free hydroxyl groups were primarily secondary hydroxyl groups.

EXAMPLE 7

To 1 mole of tris-polypropylene glycol phosphite 1025 there was added to stoichiometric amount (32 parts) of sulfur. The mixture was heated to 130° C. until reaction was complete. The product was tris-polyproylene glycol 1025 thiophosphate in which the free hydroxyl groups were primarily secondary hydroxyl groups.

EXAMPLE 8

To 1 mole of tris-polypropylene glycol phosphite 2025 there was added one atomic weight (32 parts) of sulfur. The mixture was heated to 130° C. until reaction was complete. The product was tris-polypropylene glycol 2025 thiophosphate.

The starting phosphites were made according to parent application Serial No. 109,842, filed May 1961. In order that the present specification be complete within itself the more pertinent portions of the parent application are set forth below.

Examples of polypropylene glycol phosphites in which the hydroxyl groups are primarily secondary hydroxyl groups are tris-dipropylene glycol phosphite, tris-polypropylene glycol 425 phosphite, tris-polypropylene glycol 1025 phosphite, tris-polypropylene glycol 2025 phosphite, tris-polypropylene glycol 3000 phosphite, bis-dipropylene glycol phenyl phosphite, bis-dipropylene glycol decyl phosphite, bis-dipropylene glycol p-cresyl phosphite, bis-dipropylene glycol octadecyl phosphite, bis-polypropylene glycol 425 phenyl phosphite, bis-polypropylene glycol 425 decyl phosphite, bis-polypropylene glycol 1025 octadecyl phosphite, dipropylene glycol bis-phenyl phosphite, dipropylene glycol bis-decyl phosphite, dipropylene glycol bis-octadecyl phosphite, dipropylene glycol bis-o-cresyl phosphite, polypropylene glycol 425 bis-phenyl phosphite, polypropylene glycol 1025 bis-decyl phosphite, and dipropylene glycol phenyl decyl phosphite.

The new phosphite esters have many uses. Thus, they are stabilizers for polyether polyurethanes against oxidation and degradation (as demonstrated in retarding the yellow or brown color common to such urethanes which have been exposed to air or light) and serve as plasticizers for polyurethanes, etc.

The polypropylene glycol phosphites are prepared by transesterifying a triaryl phosphite or a trialkyl phosphite with a polypropylene glycol. To prepare a tris-polypropylene glycol phosphite at least 3 moles of polypropylene glycol should be employed per mole of triaryl or trialkyl phosphite. Preferably a slight excess of the polypropylene glycol is employed. To prepare bis-polypropylene glycol mono aryl or mono arlkyl phosphites only two moles of polypropylene glycol are employed per mole of triaryl or trialkyl phosphite. To prepare mono polypropylene glycol bis aryl or bis alkyl phosphites only one mole of polypropylene glycol is employed per mole of triaryl or trialkyl phosphite. When less than three moles of polypropylene glycol are employed per mole of triaryl or trialkyl phosphite there is some tendency for polymer formation as a by-product. Such by-products can be used in the same manner as the monomeric products.

As the polypropylene glycol there can be employed dipropylene glycol, polypropylene glycol 425 (polypropylene glycol having an average molecular weight of 425), polypropylene glycol 1025 (polypropylene glycol having an average molecular weight of 1025), polypropylene glycol 2025 (polypropylene glycol having an average molecular weight of 2025) and polypropylene glycol having an average molecular weight of 3000 or mixtures thereof.

As the triaryl or trialkyl phosphite there can be used, for example, triphenyl phosphite, tri-o-cresyl phosphite, tri-p-cresyl phosphite, tri-m-cresyl phosphite, tri-xylenyl phosphite, tri-decyl phosphite, diphenyl decyl phosphite, and tri-ethyl phosphite.

The reaction can be catalyzed by alkaline catalysts, e.g., 0.1–1.0% of sodium phenolate, sodium cresylate, potassium phenolate, sodium methylate, sodium decylate, sodium dipropylene glycolate or the like, or can be catalyzed with a diaryl or dialkyl phosphite, e.g., 0.1–1% of diphenyl phosphite, di-o-cresyl phosphite, di-p-cresyl phosphite, dimethyl phosphite, diethyl phosphite didecyl phosphite, di-octadecyl phosphite, etc.

When alkaline catalysts are employed, preferably they have a pH of at least 11 in a 0.1 N solution.

Due to the fact that the alcohol groups in dipropylene glycol (and the other polypropylene glycols) are secondary and hence relatively slow in reacting, it is possible to prepare the tris-polypropylene glycols having three functional hydroxyl groups with a minimum of cross-linking or polymerization. The tris-polypropylene glycol products are insoluble and not subject to hydrolytic attack by water.

The higher polypropylene glycol phosphites can be prepared by reacting tris dipropylene glycol phosphite with propylene oxide. Reaction occurs at the free hydroxy sites and a tris-polypropylene glycol phosphite results.

EXAMPLE 9

*Tris Dipropylene Glycol Phosphite*

Triphenyl phosphite 3100 grams (10 moles), diphenyl phosphite 15 grams (catalyst) and dipropylene glycol 4422 grams (33 moles, a 10% recess) were heated in vacuo (10 mm.) at 120° C. Phenol was collected (B.P. 85–90° C. 10 mm.). As the reaction proceeded the pot temperature was allowed to rise to 155°±5° C. During this time, the distillate consisted of pure phenol until about 80% of the theoretical amount was collected. Thereafter, it was contaminated with increasing amounts of dipropylene glycol. The reaction was completed when 3250 grams of combined distillate was obtained. The pot residue after filtration through Filtercel (diatomaceous earth) was tris dipropylene glycol, a viscous colorless liquid and had an $n_D^{25}$ 1.4610, sp. gr.$^{25}$ 1.097.

EXAMPLE 10

*Tris-Polypropylene Glycol 425 Phosphite*

In the same manner as Example 9 there were reacted triphenyl phosphite 3100 grams (10 moles), diphenyl phosphite 15 grams (catalyst) and polypropylene glycol 425 in an amount of 12750 grams (30.3 moles). Heating was continued until 2780 grams of phenol (97% of theory) were recovered. The tris-polypropylene glycol 425 phosphite left in the pot was a colorless viscous liquid and had an $n_D^{25}$ 1.4535 and a $D_4^{25}$ 1.028.

EXAMPLE 11

Polypropylene glycol 1025 (9235 grams, 9.09 moles), triphenyl phosphite (930 grams, 3 moles) and diphenyl phosphite (20 grams, catalyst) were heated together in vacuo with stirring to a temperature of 210° C. and 5 mm. pressure. Phenol, M.P. 40° C. was collected (816 grams). The mixture was then swept with nitrogen for 2 hours at 210–220° C. 10 mm. pressure to complete the phenol distillation. An additional 34 grams was collected. Total yield of phenol, 850 grams (846 grams theoretical plus 18 grams from catalyst or a total of 864). The pot residue was allowed to cool to 150° C. treated with clay and filtered to give tris-polypropylene glycol 1025 phosphite in almost theoretical yield a liquid having the following properties: $n_D^{25}$ 1.4515, sp. gr.$_{15}^{25}$ 1.022.

EXAMPLE 12

In a similar manner polypropylene glycol 2025 (18,216 grams, 9.09 moles), triphenyl phosphite (930 grams, 3 moles) and diphenyl phosphite (50 grams catalyst) were reacted to give tris-polypropylene glycol 2025 phosphite in almost theoretical yield as a liquid having the properties: $n_D^{25}$ 1.4501, sp. gr.$_{15}^{25}$ 1.006.

EXAMPLE 13

Dipropylene glycol (884 grams, 616 moles) 10% excess, triphenyl phosphite (610 grams, 2 moles) and sodium (0.5 g. dissolved in a little dipropylene glycol) was reacted as described in Example 9. About 90% of the phenol was distilled out from the reaction mixture free of co-distilled dipropylene glycol. Towards the end of the reaction of a mixture of phenol and glycol was obtained. The pot residue after treatment with clay and subsequent filtration was identical in every respect to material prepared as per Example 9.

The use of alkaline catalysts also can be employed with higher polypropylene glycols to make the phosphite esters.

I claim:

1. Tris polypropylene glycol molecular weight 425 phosphate, all of the hydroxyl groups being secondary hydroxyl groups.
2. Tris polypropylene glycol molecular weight 1025 phosphate, all of the hydroxyl groups being secondary hydroxyl groups.
3. Tris polypropylene glycol molecular weight 205 phosphate, all of the hydroxyl groups being secondary hydroxyl groups.
4. Tris dipropylene glycol thiophosphate all of the hydroxyl groups being secondary hydroxyl groups.
5. Tri polypropylene glycol molecular weight 425 thiophosphate all of the hydroxyl groups being secondary hydroxyl groups.
6. Tris polypropylene glycol molecular weight 1025 thiophosphate all of the hydroxyl groups being secondary hydroxyl groups.
7. Tris polypropylene glycol molecular weight 2025 thiophosphate all of the hydroxyl groups being secondary hydroxyl groups.
8. Tris polypropylene glycol thiophosphates, all of the free hydroxyl groups being secondary alcohol groups.
9. A mixture of tris polypropylene glycol phosphates, the major amount of the phosphates present being phosphate wherein the hydroxyl groups are secondary hydroxyl groups.
10. Tris polypropylene glycol phosphates wherein each of the polypropylene glycol units has at least 3 propylene oxide units the hydroxyl groups being secondary hydroxyl groups.
11. Tris polypropylene glycol thiophosphates wherein each of the polypropylene glycol units has at least 3 propylene oxide units the hydroxyl groups being secondary hydroxyl groups.

References Cited in the file of this patent

UNITED STATES PATENTS

| | | |
|---|---|---|
| 2,372,244 | Adams et al. | Mar. 27, 1945 |
| 2,586,897 | Woodstock | Feb. 26, 1952 |
| 2,830,069 | Smith | Apr. 6, 1958 |
| 2,842,462 | Haas et al. | July 8, 1958 |
| 2,909,559 | Lanham | Oct. 20, 1959 |
| 2,934,500 | Cantrell et al. | Apr. 26, 1960 |
| 2,979,523 | Cantrell et al. | Apr. 11, 1961 |

OTHER REFERENCES

Kosolapoff: "Organo-Phosphorus Compounds," John Wiley and Sons, Inc., New York, N.Y. (1950), pp. 235–236.

Kuhn et al.: "J. Am. Chem. Soc.," 182, No. 18, 4792–4794 (1960).

UNITED STATES PATENT OFFICE

CERTIFICATE OF CORRECTION

Patent No. 3,061,625            October 30, 1962

Lester Friedman

It is hereby certified that error appears in the above numbered patent requiring correction and that the said Letters Patent should read as corrected below.

Column 6, line 19, for "205" read -- 2025 --.

Signed and sealed this 26th day of March 1963.

(SEAL)
Attest:

ESTON G. JOHNSON
Attesting Officer

DAVID L. LADD
Commissioner of Patents